Figure 1:
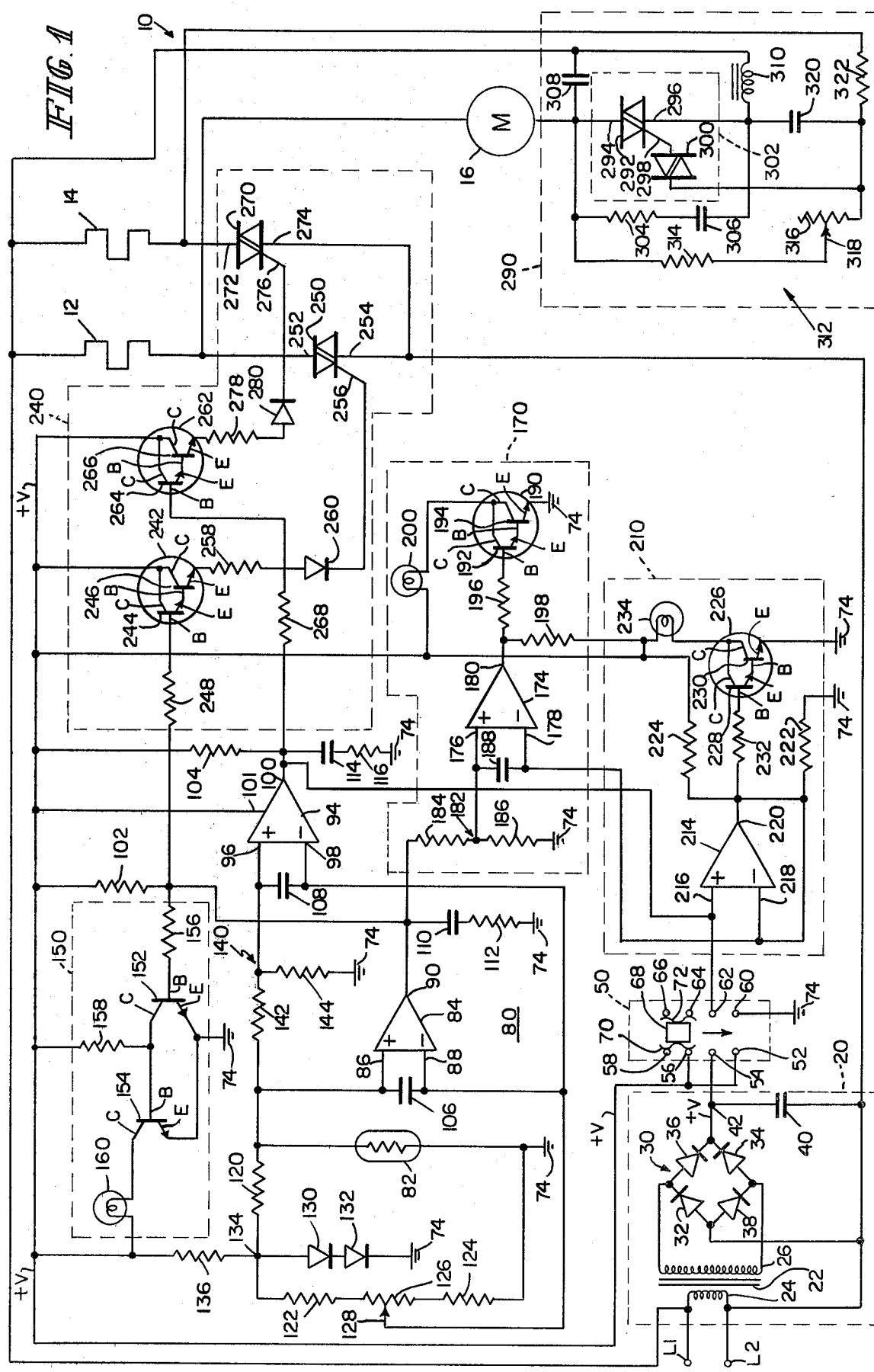

United States Patent [19]

Chesnut et al.

[11] 4,302,663
[45] Nov. 24, 1981

[54] CONTROL SYSTEM FOR A HEATER

[75] Inventors: Amos E. Chesnut; Carl R. Pittman, both of Columbus, Ind.

[73] Assignee: Arvin Industries, Inc., Columbus, Ind.

[21] Appl. No.: 118,605

[22] Filed: Feb. 4, 1980

[51] Int. Cl.³ .............................................. H05B 1/02
[52] U.S. Cl. .................................. 219/497; 219/486; 219/483; 219/494; 219/369; 219/371; 236/1 E; 126/110 AA
[58] Field of Search ............... 219/364, 366, 497, 499, 219/506, 512, 483, 486, 494, 369, 374, 370, 369, 371; 34/96; 236/1 E, 1 F; 126/101, 110 AA

[56] References Cited

U.S. PATENT DOCUMENTS

| | | | |
|---|---|---|---|
| 3,171,950 | 3/1965 | Mayer | 219/486 |
| 3,486,081 | 12/1969 | Kanbar | 219/364 |
| 3,525,851 | 8/1970 | Seabury, Jr. | 219/364 |
| 3,885,126 | 5/1975 | Sugiyama et al. | 219/364 |
| 3,973,101 | 8/1976 | Bosse | 219/364 |
| 3,978,314 | 8/1976 | Shimizu | 219/364 |
| 4,110,600 | 8/1978 | Spotts et al. | 219/486 |
| 4,141,408 | 2/1979 | Garnett | 219/486 |
| 4,167,663 | 9/1979 | Granzow, Jr. et al. | 219/497 |

Primary Examiner—Gene Z. Rubinson
Assistant Examiner—M. Paschall

Attorney, Agent, or Firm—Jenkins, Coffey, Hyland, Badger & Conrad

[57] ABSTRACT

A space heater having two heating elements and a motor/fan combination for circulating air over the heating elements to supply heated air to an environment includes a system for controlling the operation of the heating elements and the motor in response to heating requirements of the environment. The control system includes a first circuit for sensing temperature to determine a heating requirement to maintain a desired ambient temperature of the environment, a second circuit for independently activating and deactivating the heating elements in according with the heating requirements determined by the first circuit, and a third circuit for activating, deactivating, and variably controlling the volume of air circulated by the motor/fan in accordance with heating requirements determined by the first circuit. The heater housing includes a main housing portion housing the heating elements, an ambient air intake opening, a heated air exhaust vent, and the motor/fan. A secondary housing portion is mounted exterior the main housing portion so that ambient air is drawn around the secondary housing portion into the main housing portion to maintain the secondary housing at substantially ambient temperature. A temperature-sensing device is mounted in heat transfer relation to the secondary housing portion for sensing ambient temperature of the environment being heated.

34 Claims, 2 Drawing Figures

CONTROL SYSTEM FOR A HEATER

The present invention relates to heaters of the type which generally include heating elements and means for circulating a volume of ambient air over the heating elements to supply heated air to an environment. More particularly, the present invention is concerned with a system for selectively controlling the operation of the heating elements and the circulating means in accordance with heating requirements of the environment to maintain a desired ambient temperature and with improvements in detecting such heating requirements. The invention is disclosed in the context of so-called "space" heater construction, but is applicable to a much broader range of heating and air conditioning equipment.

Small space heaters have been commercially available for many years. The demand for such heaters has substantially increased with the increasing need for energy conservation. Such heaters are frequently employed to maintain the ambient temperature of a frequently used room in a building at a comfortable level while the remainder of the building is maintained at a lower temperature level in order to conserve energy. For the most part, such a heater includes an electromechanical thermostat for selecting a desired ambient temperature to be generally maintained by the heater so that the heating element and heated air-circulating means of the heater are either on or off and operate at constant settings in accordance with heating requirements. Such a conventional heater typically also includes a switch having two or more settings for its heating element, which permits the user to select the rate at which heat is supplied by the heater, for example, 750 watts or 1,500. In such a heater, when heat is required, i.e., when the ambient temperature is less than the selected desired temperature, the heater element(s) and circulating means are activated and a substantially constant volume per unit time of ambient air is circulated over the heating element(s) to be heated for supply to the environment.

Typically, the thermostat is located within the main housing of the heater and is therefore subject to heating by the heating elements. With the thermostat located inside the heater, the determination of heating requirements of the environment is affected by the temperature of the inside of the heater housing, which may be substantially higher than the ambient temperature of the environment. While adjustments can be made to the thermostat to anticipate what the ambient temperature of the environment will be when the temperature within the heater housing reaches a predetermined level, it can be appreciated that such adjustments typically cannot control with any precision the ambient temperature of the environment. Furthermore, it is known that electromechanical thermostats of types typically found in such space heaters are only accurate within certain ranges of temperatures, thereby adding to the inaccuracy associated with conventional space heater systems.

According to the invention, an air-conditioning device (e.g., a space heater) comprises first and second conditioning elements and means for circulating air past the conditioning elements to supply conditioned air to an environment. The conditioning device includes a system for controlling the operation of the conditioning elements and the circulating means in accordance with conditioning demand of the environment. In one embodiment, a first conditioning element is activated when a first predetermined difference exists between a sensed ambient temperature and a set temperature. The second conditioning element is activated so that both conditioning elements are simultaneously operating when a second predetermined difference exists between a sensed ambient temperature and the set temperature. The circulating means circulates a greater volume of air over the conditioning elements when both conditioning elements are activated than when only the first conditioning element is activated. Illustratively, the conditioner is a space heater and the elements are electrical heater elements.

Further according to an illustrative embodiment, a heater and control system includes first circuit means for sensing ambient temperatures and for comparing sensed ambient temperatures to a selected desired temperature to determine the heating requirements of the environment. The heater and control system further includes a second circuit means for independently activating and deactivating first and second heating elements in accordance with heating requirements determined by the first circuit means, and third circuit means for activating, deactivating, and variably controlling the volume of air circulated by the circulating means across the first and second heating elements, also in accordance with heating requirements determined by the first circuit means. The second circuit means includes two bi-directional triggerable switching devices and the third circuit means includes one bi-directional triggerable switching device and means for regulating the voltage supplied to the circulating means to control the volume of air circulated over the heating elements.

The illustrative heater includes a housing providing a main housing portion and a secondary housing portion mounted exterior to the main housing portion. The main housing portion includes the heating elements, an air intake opening, a heated air exhaust vent, and the circulating means. The secondary housing portion is mounted in spaced relation to the intake opening so that ambient air is drawn into the intake opening between the main housing portion and the secondary housing portion to provide an ambient air buffer between the main housing portion and secndary housing portion and to maintain the secondary housing portion at ambient temperature. The control system is mounted on the secondary housing portion and a temperature sensing device is coupled in heat transfer relation to the secondary housing portion so that the secondary housing portion and temperature sensitive device comprise in combination a temperature sensor for carefully sensing substantially the true ambient temperatures of the environment being heated, without significant contribution from the main housing portion which itself typically can be heated by the action of the heating elements and circulating means housed in it. Accordingly, temperatures being sensed by the temperature sensor substantially accurately represent the ambient temperature of the environment.

Further according to the illustrative embodiment of the present invention, a method of controlling a heater includes the steps of sensing ambient temperatures of the evironment being heated, comparing the sensed ambient temperatures to a selected desired ambient temperature (i.e., the set temperature), activating a first heating element and the circulating means when a first difference is detected between a sensed ambient temperature and the desired ambient temperature, activating the first heating element, a second heating element and the circulating means when a second difference is detected between a sensed ambient temperature and the desired ambient temperature, and operating the circulating means at a greater speed when both first and second heating elements are activated than when only the first heating element is activated.

The invention can be understood by referring to the following description and accompanying drawings which illustrate the invention.

Figure 2:
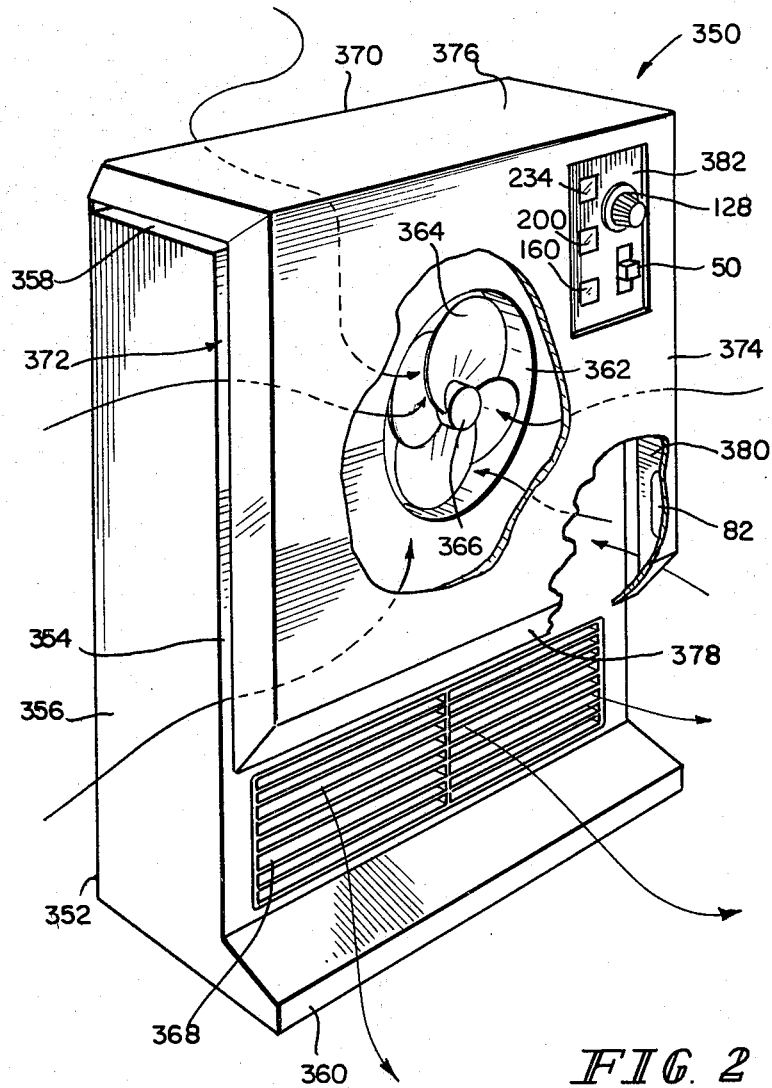

In the drawings:

FIG. 1 is a schematic circuit diagram of a heater control system constructed in accordance with the present invention; and FIG. 2 is a perspective view of a heater assembly illustrating the relationship of the control system of FIG. 1 to the assembly.

Generally speaking, a heater including a control system constructed according to the present invention operates as follows. When a first predetermined temperature difference exists between a selected desired ambient temperature (i.e., a set temperature) and a sensed ambient temperature, a first heating element, for example, a first 750 watt heating element, is activated and a fan motor which circulates air across the heating element is operated at low speed so that a reduced amount of energy is employed to maintain the desired ambient temperature. When a second and greater temperature difference exists between the sensed ambient temperature and the selected desired ambient temperature, a second heating element is activated, for example, a second 750 watt heating element, thereby providing twice the heating rate (1,500watts) and the speed of the fan motor circulating air across the heating elements is increased to a high speed so that an increased heating rate is provided. When the sensed ambient temperature and the desired ambient temperature are substantially equivalent, the heating elements and the fan motor are deactivated and the control system is placed in a standby mode of operation. Indicating lamps provide visual indications whether the control system is in the standby mode, the 750 watt mode, or the 1,500 watt mode of operation.

In FIG. 1, a system 10 for variably controlling the operation of a heater (350 of FIG. 2) is adapted to control a first 750 watt heating element 12, a second 750 watt heating element 14, and a fan motor 16 for circulating a volume of air across the heating elements 12, 14 to supply heated air to an environment. System 10 is powered from a 120 volt AC household electrical supply. Lines L1, L2 in the schematic are the AC power supply for the heating elements 12, 14 and the motor 16.

The control system 10 is powered by an unregulated DC power supply 20, which includes a step-down transformer 22 for reducing the voltage across the power supply L1, L2. The primary side 24 of the transformer 22 is coupled across L1, L2. The secondary side 26 of transformer 22 is coupled across a full-wave rectifier 30 comprising a diode bridge circuit 32, 34, 36, 38. A capacitor 40 coupled between output terminal 42 of the rectifier 30 and the AC line L2 filters the rectified signal and a positive DC voltage (+V) is supplied at terminal 42 as the output of the DC power supply 20.

A three-position slide switch 50 having OFF, AUTO or HI, and LO positions includes a first bank of terminals 52, 54, 56, and 58 and a second bank of terminals 60, 62, 64, and 66. A slidable insulated contact-carrying member 68 having contacts 70, 72 positioned on opposed sides is slidable in the direction of the arrow to one of the three positions. As shown in FIG. 1, the switch 50 is in the OFF position wherein terminals 56 and 58 are connected by contact 70 and terminals 64 and 66 are connected by contact 72. By sliding the contact-carrying member 68 in the direction of the arrow, the switch is next placed in the AUTO position wherein terminals 54 and 56 are connected by contact 70 and terminals 62 and 64 are connected by contact 72. By further sliding the contact-carrying member 68 in the direction of the arrow, the switch is placed in the LO position wherein terminals 52 and 54 are connected by contact 70 and terminals 60 and 62 are connected by contact 72. Terminal 54 is connected to terminal 42, the output of DC power supply 20. When contact member 68 is in either the LO or AUTO position, terminals 52 and 56 are connected to power supply line +V. Terminals 58, 64, and 66 are unconnected to any portion of the control system 10. Terminal 62 is connected to an input terminal 216 of the control system 10. Terminal 60 is connected to ground at 74.

The control system 10 includes a circuit 80 for sensing ambient temperature to determine the heating requirement of an environment. In a manner to be described later, the sensing circuit 80 supplies the necessary signals to control heating elements 12, 14 and fan motor 16 of the heater.

The sensing circuit 80 includes a temperature sensitive device 82 for accurately and directly sensing ambient temperatures of the environment being heated. It is known to those skilled in the art that current and voltage characteristics of thermistors can be caused to vary linearly with ambient temperature within a limited range of temperatures determined by the particular thermistor used and a linearization circuit scheme. As the current through a thermistor is increased from zero, the voltage across the thermistor will increase linearly. As the current is increased further, self-heating in the thermistor due to increased power dissipation becomes effective, the resistance begins to drop, and the voltage increase becomes non-linear. The resistance v. temperature characteristics of thermistors in general, as represented by the following expression, can be used to select appropriate resistance values for linearization of the thermistor within a desired range of temperatures:

$$R(T_1) = R(T_2)e\ B\left(\frac{1}{T_1} - \frac{1}{T_2}\right)$$

where $R(T_1)$ = thermistor resistance at temperature $T_1$
$R(T_2)$ = thermistor resistance at temperature $T_2$
e = Naperian base 2.713 . . .
B = material constant of the thermistor.

Accordingly, in the illustrated embodiment, the device 82 is a thermistor which has been linearized for sensing temperatures within a range of temperatures between 32°–90° F.

Sensing circuit 80 includes a first voltage comparator 84 of a commercially available quad comparator integrated circuit package. The comparator 84 has a positive (+) input terminal 86, a negative (−), or reference, input terminal 88, and an output terminal 90 which swings between high and low states depending upon the states of the input terminals 86, 88. A second voltage comparator 94 of the same integrated circuit package includes a positive (+) input terminal 96, a negative (−), or reference, input terminal 98, and an output terminal 100 which swings between high and low states depending upon the states of the input terminals 96, 98.

A line 101 connected to comparator 94 supplies the necessary DC power for operation of the quad comparator integrated circuit package. A resistor 102 connected between the output terminal 90 of comparator 84 and the DC power supply line (+V) and a resistor 104 connected between the output terminal 100 of comparator 94 and the DC power supply line (+V) are pull-up resistors for the output terminals of comparators 84, 94.

Oscillations within the sensing circuit 80 are attenuated by capacitors 106, 108, connected across the input terminals 86, 88 of comparator 84 and input terminals 96, 98 of comparator 94, respectively. Oscillations in the output signals from comparators 84, 94 are attenuated by a capacitor 110 and resistor 112 connected in series between the output terminal 90 of comparator 84 and ground 74 and by a capacitor 114 and resistor 116 connected in series between the output terminal 100 of comparator 94 and the ground 74.

Thermistor 82 in conjunction with resistors 120, 122 and 124 and potentiometer 126 form a Wheatstone bridge network for measuring temperature. The thermistor 82 is incorporated in one arm of the bridge network and the potentiometer 126 is incorporated in another arm. By movement of the wiper 128 of the potentiometer 126, the bridge can be made to balance at any temperature within the limited linear range of temperatures of the thermistor 82. The wiper 128 of the potentiometer 126 is connected to the reference input terminals 88, 98 of comparators 84, 94, respectively, and therefore by movement of the wiper 128 the voltage at the reference input terminals 88, 98 of comparators 84, 94, respectively, is selectively adjustable. This adjustment is made by the user of the heater to select a desired set temperature to be generally maintained within an environment by the heater. Accordingly, the wiper 128, which is accessible from the control panel 382 in FIG. 2, can be calibrated in increments of degrees Farenheit.

Reference diodes 130, 132 are serially connected between ground 74 and a junction 134 of resistors 120, 122 to maintain a constant voltage at junction 134. Resistor 136 serves to limit current through the reference diodes 130, 132 and establish the linearized range of thermistor 82 temperature. It should be noted that the thermistor 82 is directly connected to the positive input terminal 86 of comparator 84 and is connected to the positive input terminal 96 of comparator 94 through a voltage divider network 140 including resistors 142 and 144. Therefore, a balancing of the bridge network will cause the voltage on input terminals 86, 88 to be substantially equivalent, whereas the effect of the voltage divider network 140 will cause the voltages on input terminals 96, 98 to be substantially equivalent when the bridge network is imbalanced.

The operation of the sensing circuit 80 will now be described. Since the voltage between junction 134 and ground 74 of the bridge circuit is constant, by adjusting the wiper 128 of the variable resistor 126, the voltage signal at the reference input terminals 88, 98 of comparators 84, 94 can be selectively adjusted. By decreasing the resistance between the wiper 128 and ground 74, the reference voltage at input teminals 88, 98 of comparators 84, 94 is decreased. By increasing the resistance between the wiper 128 and ground 74, the reference voltage at input terminals 88, 98 of comparators 84, 94 is increased.

The wiper 128 is calibrated so that an increase in the reference voltage at input terminals 88, 98 of comparators 84, 94 represents a demand for an increase in ambient temperature for the environment, and a decrease in the reference voltage at input terminals 88, 98 of comparators 84, 94 represents a demand for a decrease in ambient temperature for the environment.

As the temperature sensed by thermistor 82 increases within the linearized range of temperatures, the voltage at input terminals 86, 96 of comparators 84, 94 decreases. As long as the voltage at input terminals 86, 96 is greater than the reference voltage at input terminals 88, 98, the output terminals 90, 100 of the comparators 84, 94 will remain high. When the voltage at input terminals 86, 96 becomes less than the reference voltage at input terminals 88, 98, indicating a sensed ambient temperature greater than the desired ambient temperature, the output terminals 90, 100 of the comparators 84, 94 swing low. When the sensed ambient temperature is less than the desired ambient temperature, the output terminal 90 of comparator 84 swings from low to high when a first predetermined difference between a sensed ambient temperature and the desired ambient temperature is detected and that, due to the effect of the voltage divider network 140, the output terminal 100 of comparator 94 will swing from low to high when a second and greater difference between the sensed ambient temperature and the desired ambient temperature is detected. In effect, therefore, the voltage divider network delays the occurrence of equal voltages at input terminals 96 and 98 until the sensed ambient temperature is substantially less than the desired ambient temperature. It will be recognized that the first and second predetermined differences between the sensed ambient temperature and the desired ambient temperature can be set at various levels. For example, by selecting appropriate resistance values for resistors 142 and 144, the second predetermined difference can be made either small or large.

Control system 10 also includes a stand-by lamp circuit 150 including two transistors 152, 154, each having a base B, a collector C, and an emitter E. The two transistors 152, 154 are connected in a common emitter configuration with the base B of transistor 152 connected to a bias resistor 156 and the base B of transistor 154 connected to a resistor 158. An indicating lamp 160 is connected between the collector C of transistor 154 and the DC power supply line (+V). When the output terminal 90 of comparator 84 is low, i.e., the sensed ambient temperature is greater than the desired ambient temperature, transistor 152 is off and transistor 154 is on so that lamp 160 provides a visual indication to the user that the heater is in the stand-by mode of operation. When the output terminal 90 of comparator 84 swings high, i.e., the sensed ambient temperature is below the desired ambient temperature, transistor 152 is on, and transistor 154 and lamp 160 are off.

A 750 watt heater indicating lamp circuit 170 includes a voltage comparator 174 which again may be one of the comparators of the quad comparator integrated circuit package described previously. The voltage comparator 174 includes a positive input terminal 176, a negative or reference input terminal 178, and an output terminal 180. A voltage divider network 182 including resistors 184 and 186 is connected to the output terminal 90 of comparator 84. The values of resistors 184 and 186 are selected such that the voltage applied to the positive input terminal 176 of comparator 174 is one-half of the voltage at output terminal 90 of comparator 84. The negative or reference input terminal 178 is connected to a voltage reference source which will be described in more detail later. Oscillations in the 750 watt heater indicating lamp circuit 170 are attenuated by capacitor 188 which is connected across the input terminals 176, 178 of the comparator 174.

A Darlington configuration transistor amplifier including transistors 192, 194 is connected to the output terminal 180 of the comparator 174. Each of transistors 192, 194 has a base B, a collector C, and an emitter E. The collectors C are connected to +V through the load, an indicator lamp 200. The emitter E of transistor 192 is connected to the base B of transistor 194 and the base B of transistor 192 is connected to the output terminal 180 of comparator 174 through a resistor 196. The emitter E of transistor 194 is connected to ground 74. A pull-up resistor 198 is connected between the output terminal 180 of the comparator 174 and +V. When the output terminal 90 of comparator 84 swings high, the output terminal 180 of comparator 174 is also caused to swing high, thereby activating the transistors 192, 194 and turning on lamp 200 to provide a visual indication to the user that heating element 12 has been activated.

A 1,500 watt heating indicating lamp circuit 210 also includes a voltage comparator 214 having a positive input terminal 216, a negative or reference input terminal 218, and an output terminal 220. Again, the comparator 214 may be one comparator from the quad comparator integrated circuit package described previously. The negative or reference input terminal 218 of comparator 214 and the negative or reference input terminal 178 of comparator 174 of circuit 170 are connected through a resistor 222 to ground 74 and through a resistor 224 to +V to set the reference input voltage for each of the comparators 214 and 174. The positive input terminal 216 of comparator 214 is connected to terminal 62 of slide switch 50 and also to the output terminal 100 of comparator 94 of the sensing circuit 80. When the slide switch 50 is located in the LO position and terminals 62 and 60 are connected by contact 72, the positive input terminal 216 of comparator 214 is connected to ground 74. When the slide switch 50 is located in the AUTO position, terminal 62 is connected to terminal 64, and the positive input terminal 216 of comparator 214 is connected to the output terminal 100 of comparator 94 of sensing circuit 80.

The output terminal 220 of comparator 214 is connected in a feedback loop to the reference input terminal 218 of comparator 220 and terminal 178 of comparator 174 so that when the output terminal 220 swings high, the voltage at reference input terminals 218 and 178 of comparators 218 and 174, respectively, is high. Since the voltage at input terminal 176 is one-half the signal at output terminal 90 of comparator 88, the increase in the reference voltage at input terminal 178 causes the voltage at output terminal 180 of comparator 174 to swing low and thereby turn off indicating lamp 200. Although the reference voltage at input terminal 218 of comparator 214 is also increased, the output 220 remains high since the voltage at positive input terminal 216 is greater than the voltage at positive input terminal 176. This difference in voltages at input terminals 176 and 216 occurs as a result of the voltage divider network 182.

Resistor 224 is connected to the output terminal 220 of comparator 214. Darlington configuration transistors 226 include transistors 228, 230 having their collectors connected to +V through an indicator lamp 234. The emitter E of transistor 228 is connected to the base B of transistor 230. The base B of transistor 228 is connected to the output terminal 220 of comparator 214 through bias resistor 232. The emitter E of transistor 230 is connected to ground at 74. Lamp 234 provides a visual indication to the user that both heating elements 12, 14 (1,500 watts total) are activated.

A heating element control circuit 240 for controlling the activation and deactivation of the heating elements 12, 14 of the heater includes Darlington-coupled transistors 244, 246. The base B of transistor 244 is connected and electrically responsive to the voltage signal at output terminal 90 of comparator 84 through a resistor 248. The emitter E of transistor 244 is connected to the base B of transistor 246. The collectors C of transistors 244, 246 are connected to +V. The emitter E of transistor 246 is connected through a current-limiting resistor 258 and a blocking diode 260 to the gate electrode 256 of a bidirectional triggerable switching device or triac 250.

The triac 250 includes two main terminals 252, 254 for controlling current flow through the first 750 watt heating element 12 from the AC lines L1, L2. When the output terminal 90 of comparator 84 swings high, the transistors 244, 246 are turned on and supply a voltage to the gate 256 of triac 250 which thereby turns on triac 250 to activate the first 750 watt heating element 12.

The heating element control circuit 240 also includes second Darlington-coupled transistors 264, 266. Transistor 264 has its base B connected to the output terminal 100 of comparator 94 of sensing circuit 80 through a resistor 268. The emitter E of transistor 264 is connected to the base B of transistor 266. The collectors C of transistors 264, 266 are connected to +V. The emitter E of transistor 266 is connected through a current-limiting resistor 278 and a blocking diode 280 to the gate electrode 276 of a second bidirectional triggerable switching device or triac 270.

The triac 270 includes two main terminals 272, 274 controlling current flow through a second 750 watt heating element 14 from the AC lines L1, L2. When the output terminal 100 of comparator 94 swings high, the transistors 264, 266 are turned on and supply a voltage to gate 276 of triac 270 to turn on triac 270 and activate the second 750 watt heating element 14.

A motor control circuit 290 includes a third bidirectional triggerable switching device or triac 292 having main terminals 294, 296 and a gate 298. A diac 300 is connected to the gate 298 for limiting current allowed to pass through gate 298 of the triac 292. Diac 300 establishes a predetermined threshold gate voltage which must be present in order for triac 292 to be turned on. Triac 292 and diac 300 can be included in a single integrated circuit package 302.

A snubber network including a resistor 304 and a capacitor 306 is connected in parallel with the main terminals 294, 296 of the triac 292. The snubber network prevents the triac from turning on when power is initially applied to the control system 10 and to insure that the triac 292 is turned off at the proper moment.

A capacitor 308 and inductor 310 serve as an LC filter to attenuate oscillations in the motor control circuit 290. Speed control of the motor 16 is determined by circuit 312 which includes diac 300, the snubber network, a resistor 314, a potentiometer 316 having a wiper 318, adjustable in one embodiment during the manufacture of the control system 10, a capacitor 320, and a resistor 322. These electrical components, connected as illustrated, control the shape of the gating voltage signal supplied to triac 292 and thereby determine the speed of the fan motor 16 in a manner to be described in the operation of circuit 290. In general, when only the first 750 watt element 12 is activated, the fan motor 16 is operated at one-half speed, and when both the first and second 750 watt elements 12, 14 are activated, the fan motor 16 is operated at full speed.

In the operation of circuit 290, when the first 750 watt heating element 12 is activated by triac 250, the triac 292 is turned on for a portion of each cycle of the AC line voltage across L1, L2 in accordance with the setting of variable resistor 316 and circuit 312 which controls the gate 298 voltage of triac 292. When only the first 750 watt element is activated, the gate 298 voltage is 100 volts. When the second 750 heating element 14 is activated by triac 270, resistor 322 is added to and affects the circuit 312, so that triac 292 is completely turned on for a greater portion of each cycle of the AC line voltage across L1, L2 and the fan motor 16 operates at full speed.

Referring now to FIG. 2, a heater 350 employing the control system 10 is illustrated. Reference numerals from FIG. 1 have been used to identify corresponding elements of the control system 10. The heater 350 includes a main housing portion 352 constructed of metal having a closed back (not shown), a front 354, two closed sides 356, a closed top 358, and a closed flared bottom 360. An opening 362 is formed in the front 354 of the main housing portion 352 to allow circulation of ambient air through the main housing portion 352. The fan motor 16 is also positioned within the main housing portion 352 and includes a fan 364 mounted thereto by a shaft 366 for rotation within the opening 362 to draw and circulate ambient air through the main housing portion 352. Exhaust vents 368 are located in the front 354 close to the flared bottom 360, for venting heated air to the environment being heated. Heating elements 12, 14 (FIG. 1) are positioned inside the main housing portion 352 so that substantially all ambient air drawn into the housing 352 by fan motor 16 must pass over the heating elements 12, 14 before being exhausted through vents 368.

The heater 350 also includes an L-shaped, metal secondary housing portion 370. Secondary housing portion 370 is mounted on the front 354 of the main housing portion 352 in spaced relation to main housing portion 352, so that ambient air is drawn into the main housing portion 352 through a space 372 provided between the main housing portion 352 and the secondary housing portion 370. With this construction technique, ambient air completely surrounds the secondary housing portion 370 at all times. Therefore, the temperature of the secondary housing portion 370 is maintained substantially at ambient temperature of the environment being heated. The ambient air is drawn into the opening 362 by fan motor 16 around the secondary housing portion 370 so that the ambient air between the main housing portion 352 and the secondary housing portion 370 serves as a buffer. The secondary housing portion 370 includes a front outside surface 374, a top outside surface 376, a bottom outside surface 378, and an inside surface 380. Importantly, the bottom outside surface 378 is constructed so as to prevent heated air vented through exhaust vents 368 from being drawn upward by the fan 364 between the main and secondary housing portions 352, 370, respectively.

A control panel 382 includes the slide switch 50, the temperature control potentiometer 128, the stand-by indicator lamp 160, the 750 watt indicator lamp 200, and the 1,500 watt indicator lamp 234, all of which have been previously described. Thermistor 82 is mounted to the inside surface 380 of the secondary housing portion 370. The thermistor 82 is mounted in heat transfer relation to the secondary housing portion 370 so that the secondary housing portion 370 serves in combination with the thermistor 82 as the ambient temperature sensor for the control system 10. Importantly, the mass of secondary housing portion 370 prevents small, transient changes in ambient temperature of the environment being heated from affecting the operation of the control system 10.

Since ambient air is being drawn through the space 372 between the main housing portion 352 and the secondary housing portion 370, the secondary housing portion 370 is always maintained at substantially ambient temperature, and accordingly, the temperature sensed by the thermistor 82 and the secondary housing portion 370 generally accurately reflects the need for heating in the ambient environment.

What is claimed is:

1. An air temperature conditioning device, comprising first and second conditioning elements, means for circulating air past the conditioning elements to condition it and supply conditioned air to an environment, and circuit means for controlling the conditioning elements, the circuit means including a temperature sensitive device for sensing ambient temperatures, means for selecting a desired ambient temperature to be generally maintained by the conditioning device, first means for comparing the sensed ambient temperature to the selected desired temperature and for causing the first conditioning element to operate when a first difference is detected between a sensed ambient temperature and the selected desired temperature, and second means for comparing sensed ambient temperature to the selected desired temperature for causing the second conditioning element to operate when a second difference is detected between sensed ambient temperature and the selected desired temperature.

2. The apparatus as recited in claim 1 wherein the first and second comparing means include first inputs, and means are provided for coupling said first inputs to the selecting means, the first and second comparing means further include second inputs, and means are provided for coupling said second inputs to said temperature-sensitive device, and said first and second comparing means further include outputs which provide first signal levels when the second inputs are equal to the first inputs and second signal levels when predetermined differences exist between the first and second inputs of the first and second comparing means to activate the first and second conditioning elements.

3. The apparatus as recited in claim 2 wherein the conditioning elements are heating elements.

4. The apparatus as recited in claim 2 further comprising means for modifying the variable relationship between the second input of the second comparing means and the temperature sensitive device, whereby the second predetermined difference between the sensed ambient temperature and the selected desired ambient temperature must be greater than the first predetermined temperature difference before the second signal level is generated at the output of the second comparing means.

5. The apparatus as recited in claim 4 wherein the modifying means includes a voltage divider network, and means for coupling the voltage divider network to the second input of the second comparing means and to the temperature sensitive device.

6. The apparatus as recited in claim 2, further comprising means for indicating when said first conditioning element is operating and when said second conditioning element is operating.

7. The apparatus as recited in claim 6 wherein the indicating means include a first lamp circuit for indicating the operation of the first conditioning element, the first lamp circuit being responsive to the output of the first comparing means, and a second lamp circuit for indicating the simultaneous operation of both the first and second conditioning elements, the second lamp circuit being responsive to the output of the second comparing means.

8. The apparatus as recited in claim 7 wherein the first lamp circuit includes an input and the second lamp circuit includes an output, and further comprising means for coupling the second lamp circuit output to the first lamp circuit input to deactivate the first lamp circuit in response to activation of the second lamp circuit.

9. The apparatus as recited in claim 8 further comprising a third lamp circuit for indicating a stand-by mode of operation of the conditioning device, wherein the sensed ambient temperature and the selected desired temperature are substantially the same and the first and second conditioning elements are inactive.

10. The apparatus as recited in claim 1, further comprising means for controlling the operation of the first and second conditioning elements in response to output states of the first and second comparing means, respectively.

11. The apparatus as recited in claim 10 wherein the controlling means include first and second bi-directional switching devices for independently activating and deactivating the first and second conditioning elements in accordance with conditioning requirements determined by comparing the sensed ambient temperatures to the selected desired temperature.

12. The apparatus as recited in claim 11 wherein the first bi-directional switching device is triggered when the first predetermined difference between the sensed ambient temperature and the selected desired temperature is detected and the output of the first comparing means is at the second signal level, thereby activating the first conditioning element.

13. The apparatus as recited in claim 12 wherein the first and second conditioning elements are heating elements, and the first predetermined difference is detected and the first heating element is activated when the sensed ambient temperature is slightly less than the selected desired temperature.

14. The apparatus as recited in claim 13 wherein the second bi-directional switching device is triggered when the second predetermined difference between the sensed ambient temperature and the selected desired temperature is detected and the output of the second comparing means is at the second signal level, thereby activating the second heating element.

15. The apparatus as recited in claim 14 wherein the second predetermined difference is detected and the second heating element is activated when the sensed ambient temperature is substantially less than the selected desired temperature.

16. The apparatus as recited in claim 15 wherein the first and second heating elements are operated simultaneously when the second predetermined difference and greater differences are detected between the sensed ambient temperature and the selected desired temperature.

17. The apparatus as recited in claim 10, further comprising means for controlling the operation of the circulating means in response to output states of the first and second comparing means to vary the volume of ambient air circulated past the conditioning elements in accordance with conditioning requirements of the environment.

18. The apparatus as recited in claim 17 wherein the means for controlling the operation of the circulating means includes a bi-directional switching device and means for coupling the bi-directional switching device to the first and second comparing means for activating the circulating means.

19. The apparatus as recited in claim 18 wherein the coupling means includes means for limiting an electrical characteristic of the bi-directional switching device and the circulating means when the first predetermined difference between the sensed ambient temperature and the selected desired temperature is detected to thereby reduce the volume of ambient air circulated over the first conditioning element.

20. The apparatus as recited in claim 19 wherein the limiting means is adjustable and includes means for overriding said limit of the electrical characteristic of the bi-directional switching device and the circulating means when the second predetermined difference between the sensed ambient temperature and the selected desired temperature is detected, the first and second comparing means outputs are at their second levels, and the first and second conditioning elements are activated to thereby increase the volume of ambient air circulated over the first and second conditioning elements.

21. A heater comprising first and second heating elements, means for circulating air over the heating elements to heat it and supply heated air to an environment, first and second bi-directional switching devices for independently switching the first and second heating elements in accordance with heating requirements to generally maintain a desired temperature of the environment, and circuit means for controlling the operation of the circulating means in response to switching of the first and second heating elements, the circuit means including a third bi-directional switching device for switching the circulating means and means for limiting an electrical characteristic of the circulating means to control the volume of ambient air circulated over the heating elements such that a greater volume of air is circulated when both the first and second heating elements are activated than when only one of the heating elements is activated.

22. The apparatus as recited in claim 21, further comprising circuit means for determining the heating requirements to maintain the desired temperature of the environment including a temperature sensitive device for sensing ambient temperature of the environment, means for selecting a desired temperature to be maintained by the heater, and means for comparing the sensed ambient temperature to the selected desired temperature, for triggering the first and third bi-directional switching devices when a first temperature difference between the sensed ambient temperature and the selected desired temperature is detected to activate the first heating element and the circulating means, and for triggering the first, second, and third bi-directional switching devices when a second temperature difference between the sensed ambient temperature and the selected desired temperature is detected to activate the first and second heating elements and the circulating means.

23. The apparatus as recited in claim 22 wherein the comparing means includes two comparators, each having a reference input, means for coupling each said reference input to said means for selecting the desired temperature of the environment, each comparator further including a second input, means for coupling each said second input to said temperature sensitive device, and each said comparator having an output which assumes a first state when its second input is equal to its reference input and a second state when its variable input is different from its reference input.

24. The apparatus as recited in claim 23 wherein the means for coupling the second input of one of the comparators to the temperature sensitive device includes means for modifying the relationship between the second input of said one of the comparators and the output of the temperature sensitive device.

25. The apparatus as recited in claim 22, further comprising a main housing portion for housing the heating elements and the circulating means, the main housing portion providing an ambient air intake opening, a heated air exhaust vent, a secondary housing portion mounted exterior to the main housing portion and in spaced relation to the intake opening, the ambient air being drawn into the main housing portion by the circulating means around the secondary housing portion to maintain the secondary housing portion at ambient temperature, and the temperature sensitive device being coupled to the secondary housing portion in heat transfer relation to sense ambient temperature.

26. A heater of the type including first and second heating elements and means for circulating a volume of air past the heating elements to heat the air and supply heated air to an environment wherein the improvement comprises a system for controlling the operation of the heating elements and the circulating means in response to heating requirements to maintain substantially a desired temperature in the environment, the control system including first circuit means for sensing ambient temperature, for selecting a desired temperature, and for causing the first and second heating elements and the circulating means to operate in first and second modes, respectively, when first and second temperature differences are detected between the sensed ambient temperature and the selected temperature, second circuit means for independently activating and deactivating the first and second heating elements in accordance with the heating requirements determined by the first circuit means, means for coupling the second circuit means to the first circuit means, third circuit means for activating, deactivating, and variably controlling the volume of air circulated by the circulating means past the heating elements in response to activation and deactivation of the first and second heating elements, and means for coupling the third circuit means to the second circuit means.

27. A heater comprising a main housing portion for housing heating elements, and means for circulating a volume of ambient air through the housing and past the heating elements to supply heated air to an environment, said main housing portion providing an ambient air intake opening and a heated air vent, and a secondary housing portion mounted exterior to the main housing and in spaced relation to the intake opening so that ambient air is drawn from the environment past the secondary housing portion into the intake opening to maintain the secondary housing portion at ambient temperature, and a system for controlling the operation of the heating elements and the circulating means, the control system including a temperature sensitive device coupled to the secondary housing portion in heat transfer relation for sensing ambient temperature of the environment, the temperature sensitive device and the secondary housing portion cooperating to provide a temperature sensor for sensing ambient temperature.

28. The apparatus as recited in claim 27 wherein the control system is mounted on the secondary housing portion and includes a control panel having controls for selection of various operational modes of the heating elements and circulating means.

29. The apparatus as recited in claim 27 wherein the main housing portion includes at least two sides, a first side providing said ambient air intake opening and heated air vent, a second side being generally perpendicular to the first side.

30. The apparatus as recited in claim 29 wherein the secondary housing portion is L-shaped and includes a first portion maintained in spaced relation to the first side of the main housing portion and a second portion maintained in spaced relation to the second side of the main housing portion.

31. The apparatus as recited in claim 30 wherein the first portion of the secondary housing portion is truncated adjacent the heated air vent to avoid interference with the flow of vented heated air and includes means for preventing the vented heated air from being drawn into the air intake opening and around the secondary housing portion.

32. The apparatus as recited in claim 31 wherein the temperature sensitive device is coupled to an inside surface of the secondary housing portion.

33. A method of controlling a heater of the type having two heating elements for providing heat and means for circulating a volume of air past the heating elements to heat the air and supply heated air to an environment, comprising the steps of sensing ambient temperature of the environment, comparing the sensed ambient temperature to a selected desired temperature, activating a first one of said heating elements when a first difference exists between sensed ambient temperature and the desired temperature and operating the circulating means at a first speed when said first heating element is activated, activating a second one of said heating elements when a second difference exists between sensed ambient temperature and the desired temperature, and operating the circulating means at a second speed when said second heating element is activated.

34. The method as recited in claim 33, further comprising the steps of indicating a first mode of operation when no heating elements are activated, indicating a second mode of operation when the first heating element is activated and the circulating means is activated at said first speed, and indicating a third mode of operation when the second heating element is activated and the circulating means is operated at said second speed.

* * * * *